United States Patent [19]

Claasen et al.

[11] 4,393,273
[45] Jul. 12, 1983

[54] FM-RECEIVER WITH TRANSMITTER CHARACTERIZATION

[75] Inventors: Theodoor A. C. M. Claasen; Gerardus C. M. Gielis; Johan M. Schmidt; Harry B. Schoonheijm, all of Eindhoven, Netherlands

[73] Assignee: U.S. Philips Corporation, New York, N.Y.

[21] Appl. No.: 226,561

[22] Filed: Jan. 19, 1981

[30] Foreign Application Priority Data

Jan. 31, 1980 [NL] Netherlands ................... 8000607

[51] Int. Cl.³ .............................................. H04H 5/00
[52] U.S. Cl. ................................... 179/1 GD; 375/110
[58] Field of Search ............. 179/1 GB, 1 GC, 1 GD, 179/1 GN; 375/110, 119

[56] References Cited

U.S. PATENT DOCUMENTS

| | | | |
|---|---|---|---|
| 4,246,440 | 1/1981 | Van Der Heide et al. | 179/1 GD |
| 4,252,995 | 2/1981 | Schmidt et al. | 179/1 GD |
| 4,276,650 | 6/1981 | de Jager et al. | 375/110 |

Primary Examiner—A. D. Pellinen
Attorney, Agent, or Firm—Thomas A. Briody; William J. Streeter; Edward W. Goodman

[57] ABSTRACT

An FM-receiver with transmitter characterization, having a tuning unit, an IF-amplifier, a demodulation circuit for demodulating a discrete transmitter characterization signal, a clock regeneration circuit, a decoding device for decoding the discrete transmitter characterization signal and a signal processing unit. The clock regeneration circuit regenerates a clock signal the period of which is obtained by dividing the frequency of the stereo pilot signal. Synchronization of the clock signal phase with the phase of the clock signal used in the transmitter is carried out by detecting, using of a periodic window signal, the average phase of the code edges in the discrete transmitter characterization signal and by choosing the phase of the regenerated clock signal to be equal thereto.

12 Claims, 8 Drawing Figures

| n 19KHz | 04 | 03 02 01 00 | 0̄4 | d c b a |
|---|---|---|---|---|
| 0  | 0 | 0 0 0 0 | 1 | 1 1 1 1 |
| 1  | 0 | 0 0 0 1 | 1 | 1 1 1 0 |
| 2  | 0 | 0 0 1 0 | 1 | 1 1 0 1 |
| 3  | 0 | 0 0 1 1 | 1 | 1 1 0 0 |
| 4  | 0 | 0 1 0 0 | 1 | 1 0 1 1 |
| 5  | 0 | 0 1 0 1 | 1 | 1 0 1 0 |
| 6  | 0 | 0 1 1 0 | 1 | 1 0 0 1 |
| 7  | 0 | 0 1 1 1 | 1 | 1 0 0 0 |
| 8  | 0 | 1 0 0 0 | 1 | 0 1 1 1 |
| 9  | 0 | 1 0 0 1 | 1 | 0 1 1 0 |
| 10 | 0 | 1 0 1 0 | 1 | 0 1 0 1 |
| 11 | 0 | 1 0 1 1 | 1 | 0 1 0 0 |
| 12 | 0 | 1 1 0 0 | 1 | 0 0 1 1 |
| 13 | 0 | 1 1 0 1 | 1 | 0 0 1 0 |
| 14 | 0 | 1 1 1 0 | 1 | 0 0 0 1 |
| 15 | 0 | 1 1 1 1 | 1 | 0 0 0 0 |
| 16 | 1 | 0 0 0 0 | 0 | 0 0 0 0 |
| 17 | 1 | 0 0 0 1 | 0 | 0 0 0 1 |
| 18 | 1 | 0 0 1 0 | 0 | 0 0 1 0 |
| 19 | 1 | 0 0 1 1 | 0 | 0 0 1 1 |
| 20 | 1 | 0 1 0 0 | 0 | 0 1 0 0 |
| 21 | 1 | 0 1 0 1 | 0 | 0 1 0 1 |
| 22 | 1 | 0 1 1 0 | 0 | 0 1 1 0 |
| 23 | 1 | 0 1 1 1 | 0 | 0 1 1 1 |
| 24 | 1 | 1 0 0 0 | 0 | 1 0 0 0 |
| 25 | 1 | 1 0 0 1 | 0 | 1 0 0 1 |
| 26 | 1 | 1 0 1 0 | 0 | 1 0 1 0 |
| 27 | 1 | 1 0 1 1 | 0 | 1 0 1 1 |
| 28 | 1 | 1 1 0 0 | 0 | 1 1 0 0 |
| 29 | 1 | 1 1 0 1 | 0 | 1 1 0 1 |
| 30 | 1 | 1 1 1 0 | 0 | 1 1 1 0 |
| 31 | 1 | 1 1 1 1 | 0 | 1 1 1 1 |

FIG.4

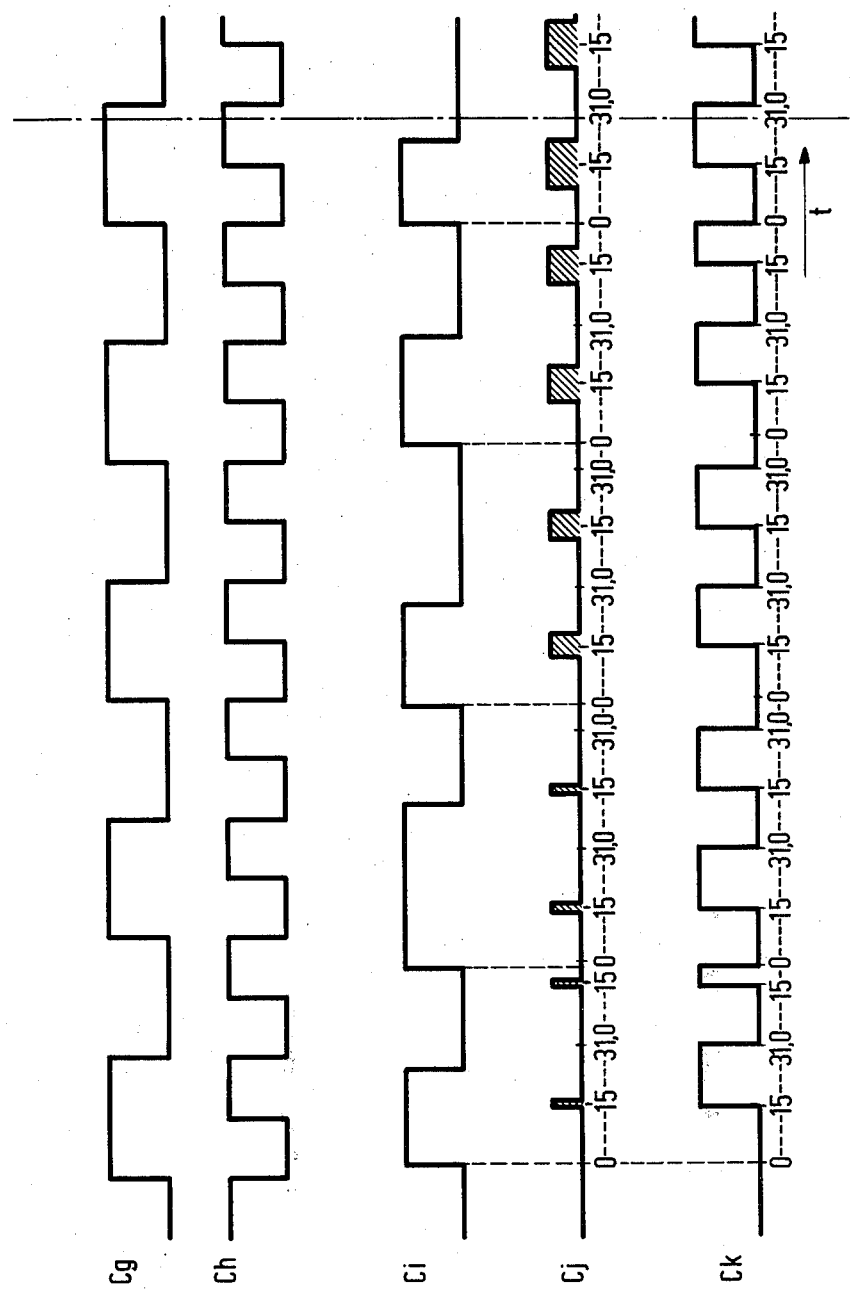

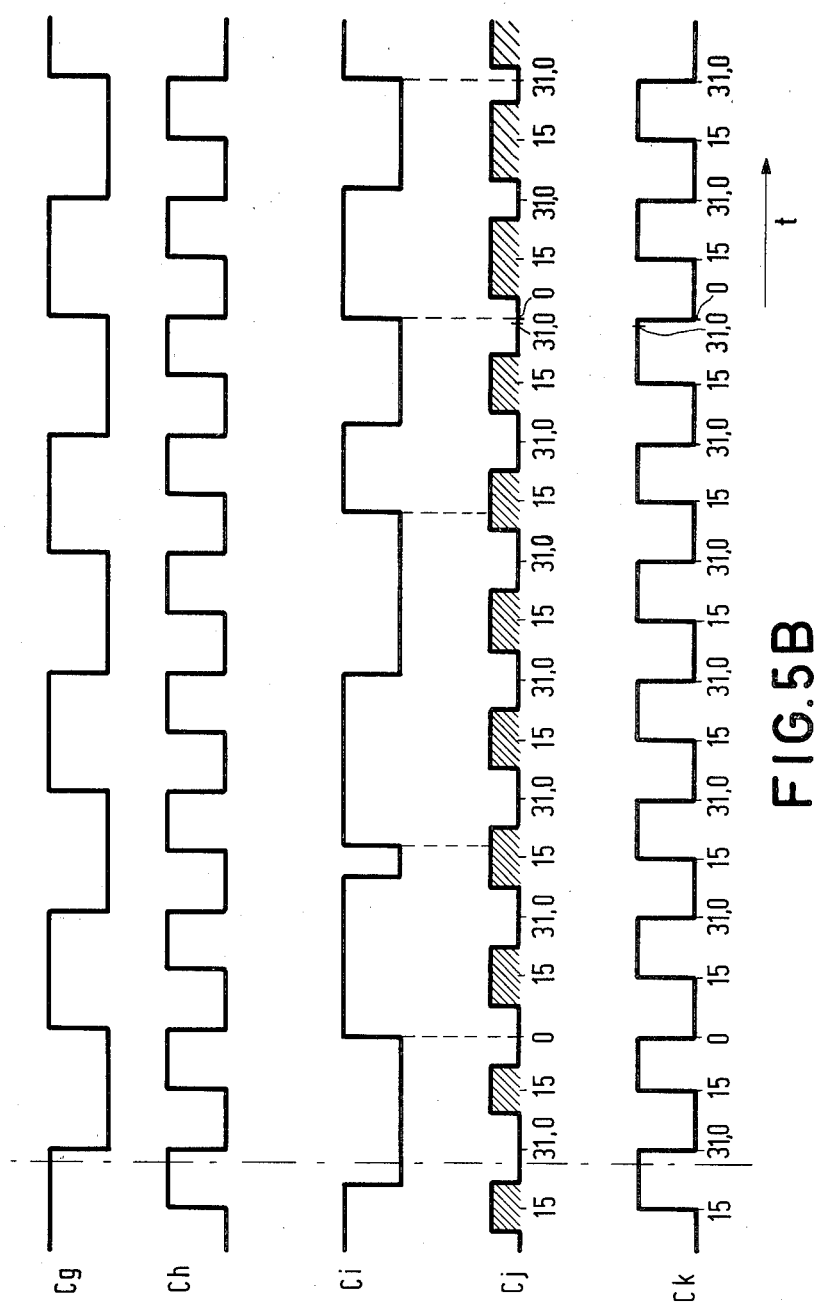

3
FM-RECEIVER WITH TRANSMITTER CHARACTERIZATION

BACKGROUND OF THE INVENTION

The invention relates to a FM-receiver with transmitter characterization, comprising a tuning unit connected to an aerial input and to which there are connected, one after the other, an IF-amplifier, a FM-detector, a demodulation circuit for demodulating a discrete transmitter characterization signal, a clock regeneration circuit, a decoding device for decoding the discrete transmitter characterization signal and a signal processing unit, also comprising a pilot regeneration circuit connected to the FM-detector for regenerating a stereo pilot signal.

Such a FM-receiver with transmitter characterisation is disclosed in the publication "The SPI-system for FM-tuning", published in 1978 by N. V. Philips' Gloeilampenfabrieken, Electronic Components and Materials division.

The known FM-receiver has the possibility to display transmitter characterization signals. The transmitter characterization signals may, for example, contain information about the location of the transmitter to which the receiver is tuned, the broadcasting company and the nature of the transmitted program. This information is transmitted in the form of continuously repeated digital messages. Each message is preceded by a start code word which is used for the word-synchronization in the receiver. For the transmission, use is made of a subcarrier in the baseband of the FM-signal, whose phase is modulated with the digital messages.

In the known FM-receiver, the transmitter characterization signals are available in digital form at the output of the above-mentioned demodulator. For an adequate decoding of these digital transmitter characterization signals, alternatively denoted code signals, a clock signal is required which is in synchronism with the clock signal with which coding was effected in the transmitter. Regeneration of this clock signal is carried out in the clock regeneration circuit, in which, in the prior art receiver, the code signals themselves are used to generate the clock signal. To that end, the frequency of the code signals is doubled and applied as control signal to a phase-locked loop. The frequency of a voltage-controlled oscillator included in the phase-locked loop is equal to the desired clock frequency. Phase deviations, if any, are corrected in a phase control circuit.

In the case of a temporary absence or disturbance of the code signals, the control of the voltage-controlled oscillator is interrupted or disturbed, which may cause the clock-code-synchronization to get lost. Further processing of the code signals already stored is not possible then because of the fact that a correct clock signal is absent. Pull-in of the phase-locked loop at the frequency determined by the code signals after such an interruption or disturbance may require so much time, depending on the bandwidth and loop gain, that a relatively short disturbance in the reception of the code signals may result in rather long interference effects in the display of the transmitter characterization signals.

SUMMARY OF THE INVENTION

It is an object of the invention to provide an FM-receiver of the type mentioned in the opening paragraph in which a proper and rapid synchronization of the regenerated clock signal with the clock signal in the transmitter is possible, even in the case of highly disturbed FM-signals, and in which a synchronized clock signal can no longer be disturbed by interruptions and disturbances in the received FM-signal, once this clock signal has been synchronized correctly.

According to the invention, a FM-receiver is therefore characterized in that the clock regeneration circuit comprises a phase search circuit including a cyclic counting device coupled to the pilot regeneration circuit for dividing at least a portion of the transmitter characterization signal into discrete phase steps determined by the periods of the pilot signal, the phase search circuit also comprising a coincidence circuit connected to the cyclic counting device and to the demodulator, for allotting phase steps to at least a portion of the pulse edges in the transmitter characterization signal, a storage circuit for storing the information about the phase steps and a phase selection circuit connected to the storage circuit for selecting the phase step in which, statistically, the greatest number of pulse edges occur in the transmitter characterization signal, the clock regeneration circuit also comprising a divider which has a set input coupled to the phase selection circuit, a signal input to the pilot regeneration circuit and a signal output to an output of the clock regeneration circuit.

The invention utilizes the fact that in the transmitter, the clock frequency is derived from the pilot frequency by division and that a change in the state of the binary code signal always occurs in the same clock phase.

The invention is based on the recognition of the fact that this makes it possible to re-obtain in the receiver, in an unambiguous manner, the clock frequency by division of the pilot frequency and that the correct clock phase can be derived from the phase in which the received code signals change state.

When the measure according to the invention is used, the moment of occurrence of a pulse edge in the received transmitter characterization signal, is related by means of the coincidence circuit to a certain counting position or phase step of the cyclic counting device. In practice, the pulse edges appear to occur, on an average, in the same phase step with a statistical distribution which is determined by noise and intersymbol interference. After a sufficiently long phase searching time, the correct clock phase can be recognized by that phase step in which the greatest number of pulse edges have occurred. Even in the case of badly disturbed code signals, it is possible to detect the proper clock phase in this manner, possibly after a certain adaptation of the clock phase, and to synchronize the receiver clock therewith. By deriving the clock signal directly from the pilot signal during or after this phase synchronization, advantageous use is further made of the fact that in the transmitter signal, the amplitude of the pilot signal is many times larger than the amplitude of the carrier on which the transmitter characterization signals have been modulated. As a result of this, the sensitivity to noise of the regenerated clock signal is very low.

According to the invention, a preferred embodiment of an FM-receiver with transmitter characterization is characterized in that the coincidence circuit comprises a gate circuit having a pulse edge detection circuit, the gate circuit having a data input connected to the demodulator and a gate input coupled to a window signal generating circuit, the window signal generating circuit being connected to the cyclic counting device and generating a window signal which, in at least one counting position of the cyclic counting device, opens the gate circuit for one window period in order to allot a phase step to at least one of the pulse edges occurring within the window period in the transmitter characterization signal.

When this measure is used, an iterative time window is placed on the received code signal by means of the gate circuit. The time windows may consist of one or a plurality of consecutive phase steps. The maximum size of a time window is determined by the dividing factor used for the division of the pilot frequency. The iterative time window renders it possible to allot phase steps to relevant pulse edges in the transmitter characterization signal in a simple manner.

A further preferred embodiment of an FM-receiver according to the invention is characterized in that the gate circuit has n gates and the window signal generating circuit has n window signal generators included between the cyclic counting device and the gates for sequentially opening the gates at n counting positions of the cyclic counting device per clock period, the storage circuit comprising n counting devices coupled to the outputs of the respective gates for counting the number of transmitter characterization signal pulse edges passed by the gates, and the phase selection circuit comprising a detection circuit for finding the counting device having the highest position after at least one clock period.

When this measure is used, a parallel phase selection is carried out. The n window signals divide the clock signal in each clock period into n-phase intervals, while the n counting devices record the number of pulse edges per phase interval. By means of the top detection circuit, the counting device having the highest position is detected and thus the phase interval which contains the correct clock phase.

If necessary, refinements can be made in this phase selection by further subdividing the phase interval into m subintervals and counting the pulse edges occurring therein. When the above-described measure is then used, again it is possible to detect, by means of the top detection circuit, the phase subinterval with which the clock phase should be synchronized.

A still further preferred embodiment of such an FM-receiver is characterized in that n is equal to the number of periods of the pilot signal within one period of the clock signal.

When this measure is used, the phase intervals correspond with one period of the pilot signal and the correct clock phase is detected accurately after one phase selection action.

A further preferred embodiment of such an FM-receiver is characterized in that the top detection circuit comprises a threshold circuit for applying a setting signal to the divider at the moment one of the counting devices reaches the threshold position.

When this measure is used, the phase searching time depends on the rate of occurrence of the pulse edges and a simple realization of the top detection circuit is possible.

Another preferred embodiment of an FM receiver according to the invention is characterized in that the window signal generating circuit includes a window width control for monotonously varying, during one phase searching period, the duration of the window time period of the window signal from at most one clock period to at least substantially zero, as well as a window phase control which comprises the storage circuit and the phase selection circuit for controlling the window phase, the windows of the window signal being at least substantially symmetrical around a phase which lies an integral number of times the clock period from the phase of a pulse edge in the transmitter characterization signal which comes first within a preceding window.

In contrast with the above-described embodiments which use a parallel phase selection procedure, the phase selection in this preferred embodiment is carried out sequentially. When the last-mentioned measure according to the invention is used, the window period or window width decreases monotonously during the phase searching procedure and a phase control is used in which a first pulse edge, which occurs within a window, opens a next window such that its central window phase, that is to say the phase step in the center of a window, is located at a distance of one clock period from this pulse edge. As with normal FM-signals and even with FM-signals which are just acceptable, the number of pulse edges occurring in the central pulse edge phase is significantly larger than the number of pulse edges in adjacent window phases, the chance that the central window phase of a window coincides with a pulse edge is relatively large. Because of the converging window width this chance increases still further during the phase searching action. In the final condition, the window is closed around the phase averaged by the pulse edges. This average pulse edge phase corresponds with the phase of the clock signal by means of which the transmitter characterization signal has binary-coded in the transmitter. This sequential phase selection procedure renders it possible for a clock signal to be present from the first incoming code edge. The phase of this clock signal is iteratively corrected by the converging window until the proper clock phase has been reached. As furthermore only the phase of a first pulse edge occurring within a window period must be stored, a simple implementation of the storage circuit becomes possible. A further preferred embodiment of such an FM-receiver is characterized in that the window width control circuit has a state counter the position of which varies monotonously from an initial to a final position during the phase searching period and that the storage circuit comprises the cyclic counting device, a setting input of which is coupled to an output of the gate circuit to start a counting cycle at a pulse edge which occurs first within a window period, this phase selection circuit comprising a comparison circuit connected to the state counter and to the cyclic counting device for reversing the signal value of the window signal at the positions of the cyclic counting device indicated by the state counter. When this measure is used the cyclic counting device divides the transmitter characterization signal into discrete phase steps, as in the preceding embodiments, and also functions as a storage circuit, as the counting cycle is continuously restarted at the occurrence of a pulse edge which occurs first within a window period. Therefore, the counting position of the cyclic counting device directly indicates the phase distance to this pulse edge. The counting position of the state counter indicates the window width while, by means of the comparison circuit, it is determined at which counting position of the cyclic counting device the windows start or end.

A further preferred embodiment of this FM-receiver according to the invention is characterized in that an input of the state counter is coupled to an output of the demodulation circuit in order to control the decrease of the window periods in dependence on the occurrence of windows in which at least one pulse edge occurs. When this measure is used, the phase searching period depends on the frequency of windows in which at least one pulse edge occurs and a simple implementation of the position counter is possible.

A still further preferred embodiment of such an FM-receiver is characterized in that the clock regeneration circuit comprises two modulo-n-counters which function as dividers and which are both coupled to an output of the pilot regeneration circuit via signal inputs and to an output of the gate circuit via resetting inputs so that they can alternately be in operation at consecutive pulse edges in the gate circuit output signal.

When this measure is used, a clock signal is already available during the phase searching procedure so that, especially with slight disturbances a proper decoding of the transmitter characterization signals can be rapidly performed.

Another preferred embodiment of this FM-receiver is characterized in that a pulse suppression circuit is included in conjunction with the clock regeneration circuit for suppressing pulses having a pulse width smaller than at least approximately half a clock period.

When this measure is used, it is assumed that pulses of the pulse width are the result of noise. By limiting the pulse edges of these noise pulses, the number of noise edges in the code signal applied to the clock regeneration circuit is reduced and a rapid phase synchronization is possible.

DESCRIPTION OF THE DRAWINGS

The invention will now be further described by way of example with reference to the Figures shown in the accompanying drawing, in which:

FIG. 4 is a coding Table as used with, for example, coding of the phase steps of the 19 kHz pilot signal;

FIGS. 5a and 5b are time diagrams Cg to Ck, inclusive, to illustrate the operation of the phase searching circuit as used in the clock regeneration circuit of FIG. 2;

DESCRIPTION OF THE PREFERRED EMBODIMENTS

Figure 1A:
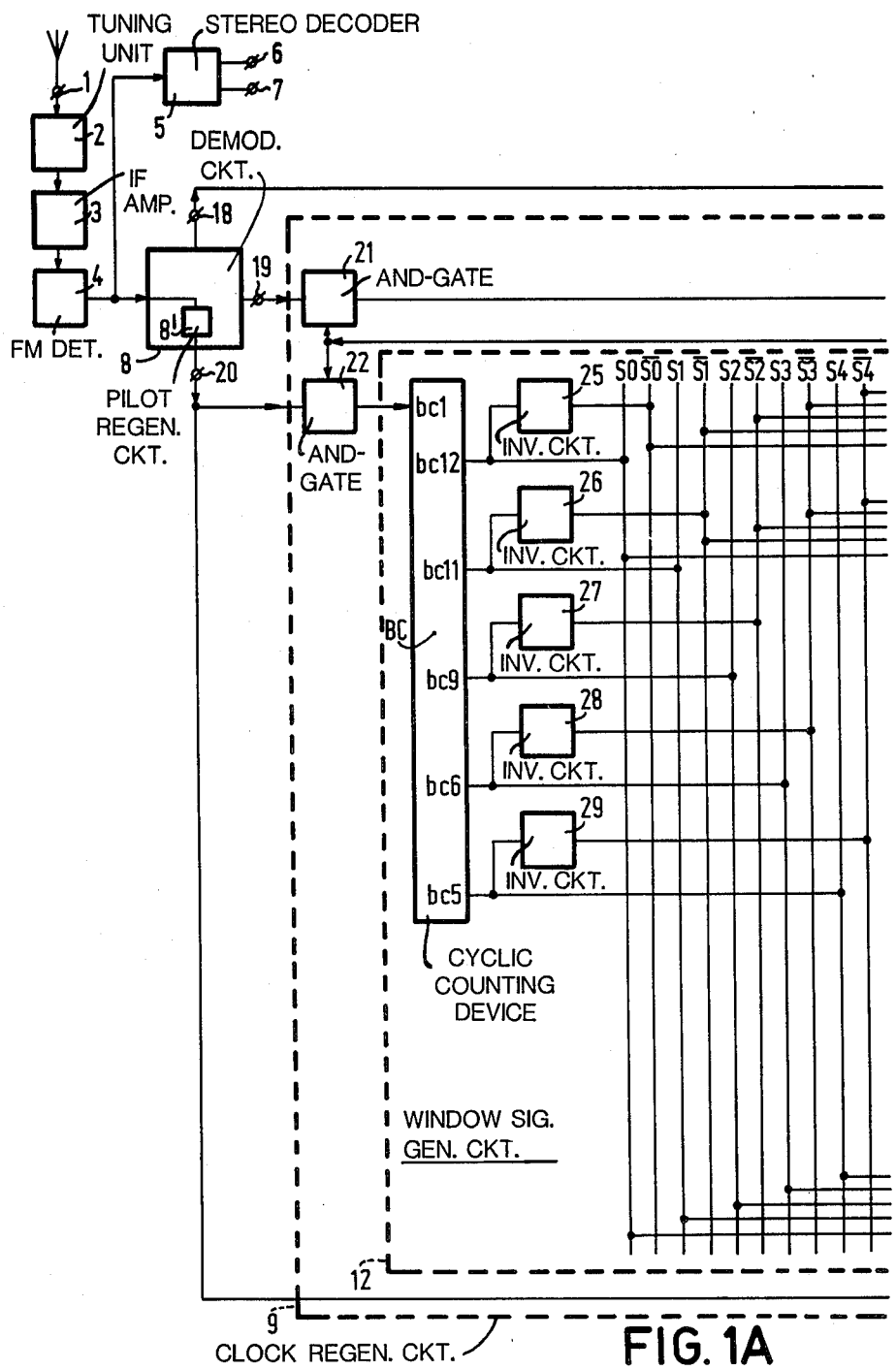
FIGS. 1a and 1b show an FM-receiver with transmitter characterisation according to the invention with a first construction of the clock regeneration circuit.
Figure 1B:
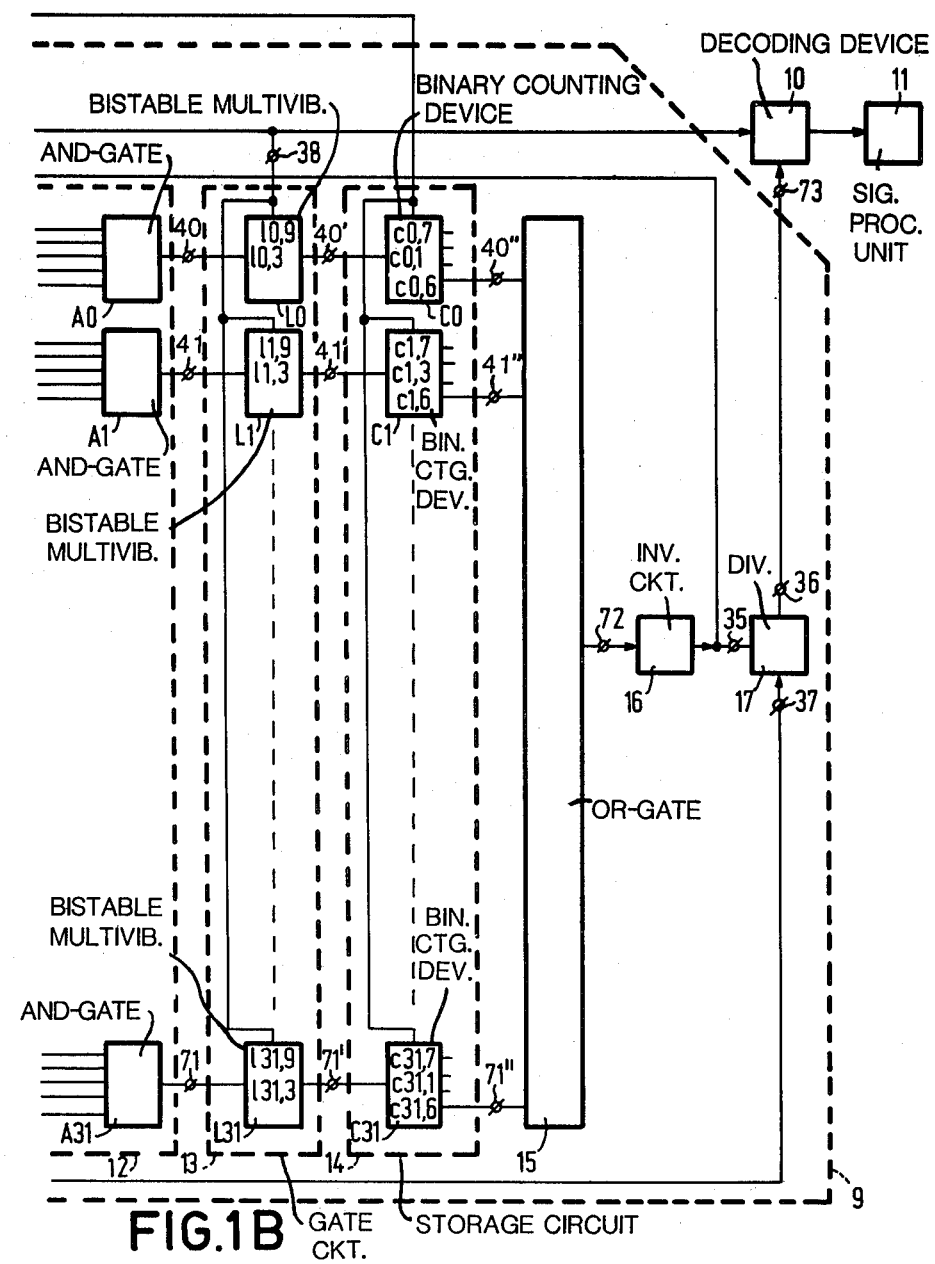

FIGS. 1a and 1b show an FM-receiver with transmitter characterization according to the invention, comprising a tuning unit 2, which is connected to an aerial device via an aerial input 1 and also to, one after the other, an IF-amplifier 3, an FM-detector 4 and a stereo decoder 5 having audio outputs 6 and 7. By means of these circuits, a desired FM-stereo signal is selected in known manner from the aerial signals received by the aerial device and is processed to stereo signals of audio frequency. The FM-detector 4 is also connected to a demodulation circuit 8 for demodulating a transmitter characterization signal, a clock regeneration circuit 9, a decoding device 10 for decoding the discrete transmitter characterization signal, and a signal processing unit 11. The demodulation circuit 8 has a pilot regeneration circuit 8'.

The FM-detector 4 applies a stereo multiplex signal to the demodulation circuit 8, in which selection and demodulation of the transmitter characterization or code signal is carried out. The code signal is available in digital form at a data terminal 19. For the demodulation, use is made of an auxiliary signal derived from the 19 kHz stereo pilot signal. Regeneration thereof is done in the pilot regeneration circuit 8'. The regenerated 19 kHz stereo pilot signal is available at a pilot signal output 20.

When an FM-transmission signal is pulled in, a resetting signal, which has for its purpose to trigger the clock regeneration circuit 9, is generated in the demodulation circuit 8. This resetting signal is available at a reset signal terminal 18.

In the manner described hereinafter, a clock signal which is applied to the decoding device 10, to which also the digital code signal is applied, is regenerated in the clock regeneration circuit 9. The code signal is decoded in this decoding device, that is to say the code signal is converted therein into a control signal for a character generator incorporated in the signal processing unit 11.

The character generator produces control signals for an alphanumerical picture display device with which the transmitter and program information can be displayed in alphanumerical characters. The picture display device is also included in the signal processing unit 11.

Detailed knowledge of the operation of the demodulation circuit 8, the decoding device 10 and the signal processing unit 11 is not necessary to understand the invention. For a further description reference is therefore made to the above-mentioned publication.

The clock regeneration circuit 9 comprises the phase searching circuit 12 to 16, inclusive, which is coupled to a set input 35 of a divider 17. A signal input 37 of the divider 17 is coupled to the pilot signal output 20 of the demodulation circuit 8. A signal output 36 of the divider 17 is connected to the decoding device 10 via an output 73 of the clock regeneration circuit 9.

The phase searching circuit 12 to 16, inclusive, comprises a gate circuit 13, which functions as a coincidence circuit and includes a pulse edge detection circuit. Via a data input 38 and an AND-gate 21, the gate circuit 13 is connected to the data terminal 19 of the demodulation circuit 8 and via a gate input having 32 terminals 40 to 71, inclusive, to a window signal generating circuit 12. The window signal generating circuit 12 is connected to the pilot signal output 20 of the demodulation circuit 18 via an AND-gate 22. An output of the gate circuit 13 is connected to a storage circuit 14 via 32 output terminals 40' to 71', inclusive. Via 32 output terminals 40" to 71", inclusive, an output of the storage circuit 14 is connected to an OR-gate 15, which functions as a phase selection circuit. An output of the OR-gate 15 is connected to the set input 35 of the divider 17 via an inverter circuit 16, and is also connected to gate inputs of the AND-gates 21 and 22. The inverter circuit 16 is used on the one hand to adapt the polarity of the output signal of the OR-gate 15 to the polarity of the setting signal required to start the divider 17, and on the other hand to block the 19 kHz pilot signal and the code signal after a phase selection, so that the phase searching circuit stops and remains at the phase it has sought.

The window signal generating circuit 12 comprises a cyclic counting device BC an input terminal bc1 of which is coupled to the pilot signal output 20 via the AND-gate 22. Outputs bc12, bc11, bc9, bc6 and bc5 are coupled, on the one hand, directly to the signal lines S0, S1, S2, S3 and, S4, respectively, and on the other hand, to signal lines $\bar{S}0$, $\bar{S}1$, $\bar{S}2$, $\bar{S}3$, $\bar{S}4$ via inverter circuits 25 to 29, inclusive. The signal lines S0 to S4, inclusive, and $\bar{S}0$ to $\bar{S}4$, inclusive, are coupled to inputs of AND-gates A0 to A31, inclusive, which function as window signal generators, in accordance with the standardized BCD-coding of the indices of the gate. In this manner the inputs of the AND-gate A0 (0=00000) are connected to the signal lines $\bar{S}0$ to $\bar{S}4$, inclusive, those of the AND-gate A1 (1=10000) to the signal lines S0 and $\bar{S}1$ to $\bar{S}4$, inclusive, etc. The inputs of, for example, the AND-gate A13 (13=10110) are connected to the signal lines S0, $\bar{S}1$, S2, S3, $\bar{S}4$ and the inputs of the AND-gate A31 (31=11111) are connected to the signal lines S0 to S4, inclusive.

When a desired FM-signal is pulled in, the 19 kHz pilot signal is applied to the input terminal bc1 of the cyclic counting device BC via the AND-gate 22. The cyclic counting device BC comprises a number of cascaded bistable multivibrators, not shown, which serially divide the frequency of the 19 kHz pilot signal by two. The outputs of these bistable multivibrators are connected to the outputs bc12, bc11, bc9, bc6 and bc5 of the cyclic counting device BC and produce digital signals whose voltage values may be high (denoted, for example, by 1) or low (for example 0). Reversing of the voltage value from 0 to 1 and vice versa occurs at the signal at the output bc12 in the frequency of the pilot signal (19 kHz). At the outputs bc11, bc9, bc6 and bc5, these reversing actions occur in the same phase and in the frequencies (19/2) kHz, (19/4) kHz, (19/8) kHz, (19/16) kHz. In this manner the periods of the 19 kHz pilot signal are binary counted in accordance with the standard BCD-code in a 32 step cycle. The voltages at the outputs bc12, bc11, bc9, bc6 and bc5 of the cyclic counting device BC are transferred to the signal lines S0 to S4, inclusive, and to the signal lines S0 to S4, inclusive, via the inverter circuits 25 to 29, inclusive, in which the signal value is inverted.

By connecting the AND-gates A0 to A31, inclusive, in the above-described manner to the signal lines S0 to S4, inclusive, and $\bar{S}0$ to $\bar{S}4$, inclusive, these AND-gates are sequentially opened for one period of the 19 kHz pilot signal in the sequence defined by the indices of the gates A0 to A31, inclusive. Thus, periodic window signals appear at the terminals 40 to 71, inclusive, each signal having a constant window width which is equal to one period of the 19 kHz pilot signal and a pulse repetition period corresponding with the cycle period of the cyclic counting device BC (=(32/19) msec). The phases of these window signals are positioned such that during one cycle period of the cycling counting device BC, the windows or window periods at the terminals 40 to 71, inclusive, follow one another sequentially. Within the window periods a gate signal is applied to the gate circuit 13 during one period of the 19 kHz pilot signal (1/19 msec) via the control terminals 40 to 71, inclusive.

The gate circuit 13 includes 32 bistable multivibrators L0 to L31, inclusive, which function as pulse edge detection circuits as respective first inputs 10,3 to 131,3 inclusive, thereof are coupled to the terminals 40 to 71, inclusive, and set inputs 10,9, to 131,9, inclusive, thereof are coupled to the data input 38 of the gate circuit 13. Outputs of the bistable multivibrators L0 to L31, inclusive, are coupled to output terminals 40' to 71', inclusive, of the gate circuit 13.

On receipt of an FM-signal with transmitter characterization signals, a digital transmitter characterization or code signal is applied to the data input 38 via the data terminal 19 of demodulation circuit 8 and the AND-gate 21. This digital code signal is applied in parallel to the set inputs 10,9 to 131,9, inclusive, of the bistable multivibrators L0 to L31, inclusive. However, because of the gate signals at the terminals 40 to 71, inclusive, only one of the 32 bistable multivibrators L0 to L31, inclusive, which function as gates, is "open" in each period of the 19 kHz pilot signal. An ascending pulse edge in the code signal causes a setting signal to be applied to all bistable multivibrators L0–L31 but produces a change in the voltage value only at the output of last-mentioned bistable multivibrator. In this way, the window signals "open" sequentially the bistable multivibrators L0 to L31, inclusive, in the sequence defined by their indices, in response to which, the code signal is divided in frames of 32/19 msec. and within each frame, into 32 discrete phase steps of 1/19 msec.

As a clock signal which has been derived from the pilot frequency by dividing it by a factor of 32 is used when coding the digital transmitter characterization signal in the transmitter, the cycle period of the cyclic counting device BC is equal to the period of the clock signal. In addition, signal value reversals of the digital transmitter characterization signal or the code edges in the transmitter are carried out in the same clock phase. This means that the changes in the signal value of the code signal, for example the positive code edges, are spaced an integral number of times the clock period apart. Owing to noise and intersymbol interference, a spread may occur therein on reception. However, the majority of code edges are, on an average, located in the same phase and manifest themselves at the output of one and the same bistable multivibrator.

The bistable multivibrators L0 to L31, inclusive, are coupled to inputs c0,1 to c31,1 of binary counting devices C0 to C31, inclusive, of the storage circuit 14 via the output terminals 40' to 71' inclusive, respectively. These bistable multivibrators function in the same way as the cyclic counting device BC described hereinbefore. Reset inputs c0,7 to c31,7, inclusive, of the binary counting devices C0 to C31, inclusive, are coupled to the reseting signal terminal 18 of the modulation circuit 8 to adjust the last-mentioned counting devices to an initial value (0). The binary counting devices C0 to C31, inclusive, are coupled to the output terminals 40" to 71", inclusive, of the storage circuit 14 via terminals c0,6 to c31,6, inclusive, respectively.

The binary output signal at the respective terminals c0,6 to c31,6, inclusive, changes state at the $8^{th}$ pulse edge at the inputs c0,1 to c31,1, respectively. The connections of the terminals c0,6 to c31,6, inclusive, to the inputs of the OR-gate 15 via the output terminals 40" to 71' inclusive form a threshold circuit as when the threshold position, i.e. the $8^{th}$ pulse edge, is reached at the input of at least one of the binary counting devices C0 to C31, inclusive, the signal causes the output of the relevant binary counting device to change its value and consequently, also the output value of the OR-gate 15. Thus, the OR-gate 15 functions at the same time as a top detection circuit. As for normal FM-signals and even for FM-signals which are just acceptable, the majority of code edges occur in the average phase, only that binary counting device to which these pulse edges are continuously applied reaches this threshold position first and a setting signal is applied at that moment to the divider 17 via the OR-gate 15 and the inverter circuit 16. In response thereto the divider 17 starts dividing the frequency of the 19 kHz pilot signal, a dividing factor of 32 being used. As this frequency division is started in a phase which is indicated, on an average, by the code edges, the phase of the regenerated clock signal at the signal output 36 of the divider 17 is equal to the phase of the clock signal with which the code signal in the transmitter has been coded.

The last-mentioned setting signal is further applied to the gate inputs of the AND-gates 21 and 22, which block the passage of the code signal and the pilot signal, respectively, to the gate circuit 13 and the control signal generating circuit 12. The phase searching action is stopped as a result thereof.

On tuning to another FM-signal, the binary counting devices C0 to C31, inclusive, of the storage circuit 14 are adjusted to the initial value 0 by the resetting signal generated in the demodulation circuit 8, which causes a 0-signal to appear also at the output of the OR-gate 15 and therewith opening the AND-gates 21 and 22. This causes the clock regeneration circuit 9 to be in the initial state again, from which a new phase searching action as described above is possible again.

In a practical embodiment the clock regeneration circuit 9 is implemented by means of integrated circuits which are described in the manual "Data Handbook: Semiconductors and integrated circuits—part 6, October 1977" entitled "Digital Integrated Circuits LOCMOS HEF 4000B Family", published by N. V. Philips' Gloeilampenfabrieken, Electronic Components and Materials division. The reference numerals used in this manual for the terminals are also used to denote the terminals of the relevant integrated circuits shown in FIG. 1. Thus, the cyclic counting device BC is implemented by means of the integrated circuit (i.c.) HEF 4024. The inverter circuits 25 to 29, inclusive, are implemented by means of the i.c.'s HEF 4049. The AND-gates A0 to A31 are implemented by means of the i.c.'s HEF 4073. The bistable multivibrators L0 to L31 of the gate circuit 3 are implemented by means of i.c.'s HEF 40174. The binary counting devices C0 to C31, inclusive, of the storage circuit 14 are implemented by means of i.c.'s Hef 4520. The OR-gate 15 is implemented by means of i.c. HEF 4075, the inverter circuit 16 by means of i.c. HEF 4049 and the divider 17 by means of i.c. HEF 4520.

It will be obvious that other criteria may alternatively be used for the determination of the binary counting device having the highest position. It is, for example, possible to stop the phase searching action when the position of one of the binary counting devices C0 to C31, inclusive, exceeds, with a constant amount (for example 2) or a constant factor, the positions of the other counting devices. The positions of the counting devices must then be compared with one another and the differences in positions must be applied to the threshold circuit of the top detection circuit. In this manner it is possible to obtain a more rapid phase synchronization particularly for FM-signals which are disturbed to a lesser extent.

In the phase selection procedure shown, the code signal is first divided into frames of periods having a length of one clock period and thereafter it is recorded per phase step whether a code edge occurs or does not occur. It will be obvious that such a phase selection may alternatively be carried out in several selection steps by making, for example, first a subdivision into n-phase intervals per period after the code signal has been divided into frames having a duration equal to the length of one clock period. These phase intervals may comprise a number of phase steps. In the manner adopted in the construction shown it is possible to detect that phase interval in which the majority of code edges occur. By thereafter further subdividing this phase interval into subintervals it is possible to determine the clock phase more accurately. This can be repeated continuously until the phase intervals finally do not contain more than one phase step (1/19 msec.).

It should be noted that it is possible to avoid the use of the divider 17 by utilizing the dividing action of the cyclic counting device BC.

Figure 2:
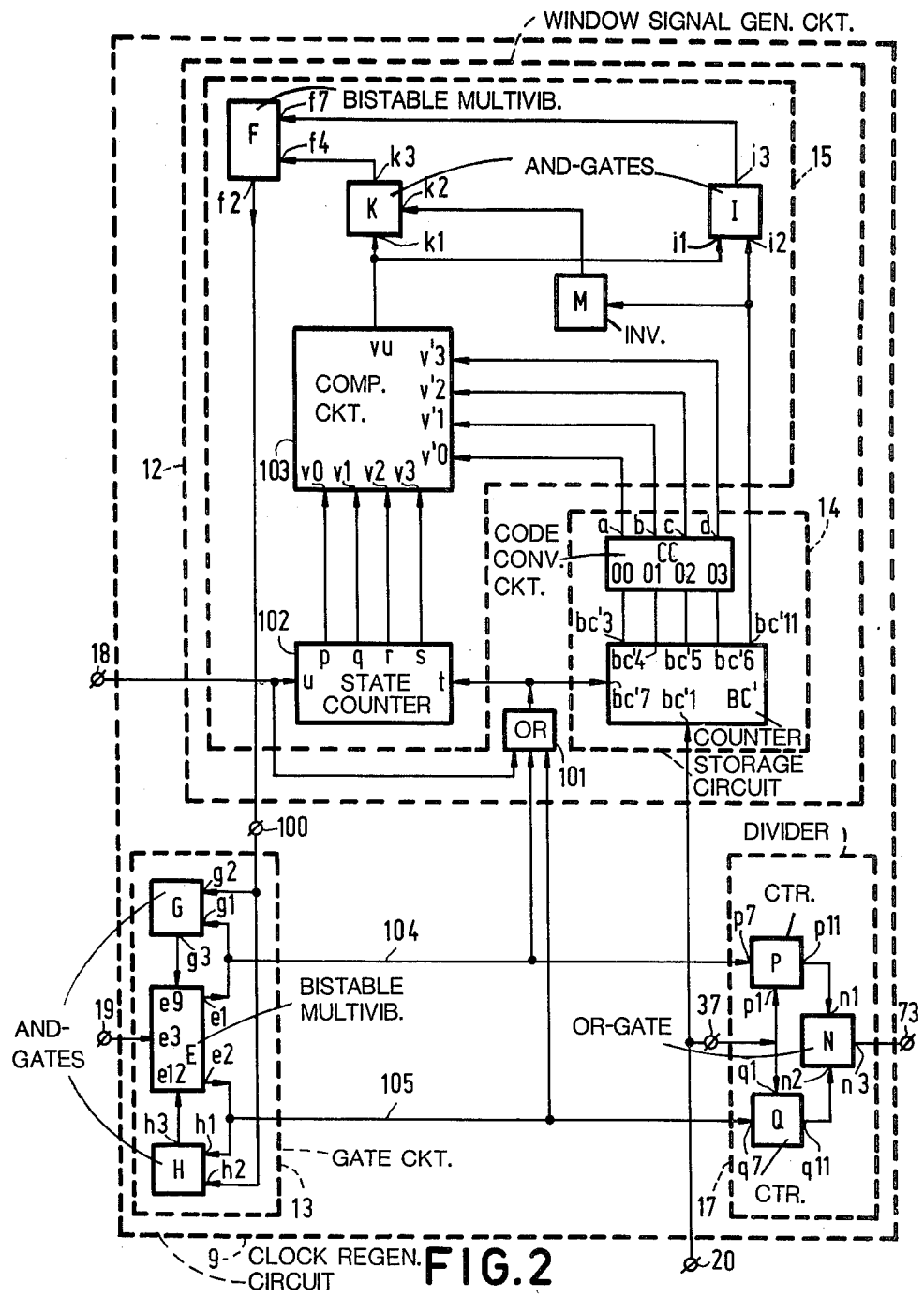
FIG. 2 shows a second construction of the clock regeneration circuit of an FM-receiver according to the invention.

FIG. 2 shows a clock regeneration circuit 9 of an FM-receiver with transmitter characterization according to the invention, in which components which correspond to the components of the preceding Figure have been given the same reference numerals. The gate circuit 13 comprises a bistable multivibrator E of the JK flip-flop type having a data input e3, which is coupled to the data terminal 19 for applying thereto the digital code signal, a setting input e9 (set-direct input), coupled to an output g3 of an AND-gate G, a resetting input e12 (clear-direct input) coupled to an output h3 of an AND-gate H and complementary outputs e1 and e2, which are coupled to setting input p7 and q7 of modulo 32-counters P and Q, respectively, of the divider 17 via signal lines 104, 105. The complementary outputs e1 and e2 are also coupled to the inputs g1 and h1, respectively, of the AND-gates G and H. Inputs g2 and h2 of the AND-gates G and H, respectively, are coupled to a gate input 100 of the gate circuit 13.

The divider 17 comprises an OR-gate N whose inputs n1 and n2 are coupled to outputs p11 and q11, respectively, of the modulo-32-counters P and Q. Signal inputs p1 and q1 of the respective modulo-32-counters P and Q are coupled to the pilot signal output 20 of the demodulation circuit 8. An output n3 of the OR-gate N is coupled to the output 73 of the clock regeneration circuit 9. Assuming that there is no gate inhibiting signal in the window signal at the gate input 100 of the gate circuit 13, the circuit described so far operates as follows.

Positive pulse edges in the digital code signals, that is to say signal value changes in which the signal voltage changes from a low 0-value to a high or 1-value at the data input e3 of the bistable multivibrator E, produce signal value changes at the complementary outputs e1 and e2. That is to say, a positive pulse edge in the code signal causes a high signal voltage (1) at e1 to change into a low signal voltage (0) at e1 and a low signal voltage (0) at e2 to change into a high signal voltage (1) at e2 and vice versa. For each 0-voltage at the inputs p7 and q7 of the modulo-32-counters P and Q, these counters are activated and the counting or dividing action of these modulo-32-counters is stopped at a 1-voltage.

Thus, in response to a positive pulse edge in the code signal, dividing the frequency of the 19 kHz pilot signal in the divider 17 is switched from the modulo-32-counter P to the modulo-32-counter Q or vice versa. In the absence of noise and intersymbol interference, adding together the output signals of the modulo-32-counters P and Q in the OR-gate N results in a correct phase-synchronized clock signal having a frequency of (19/32) kHz at the output 73 of the clock regeneration circuit 9.

Figure 3:
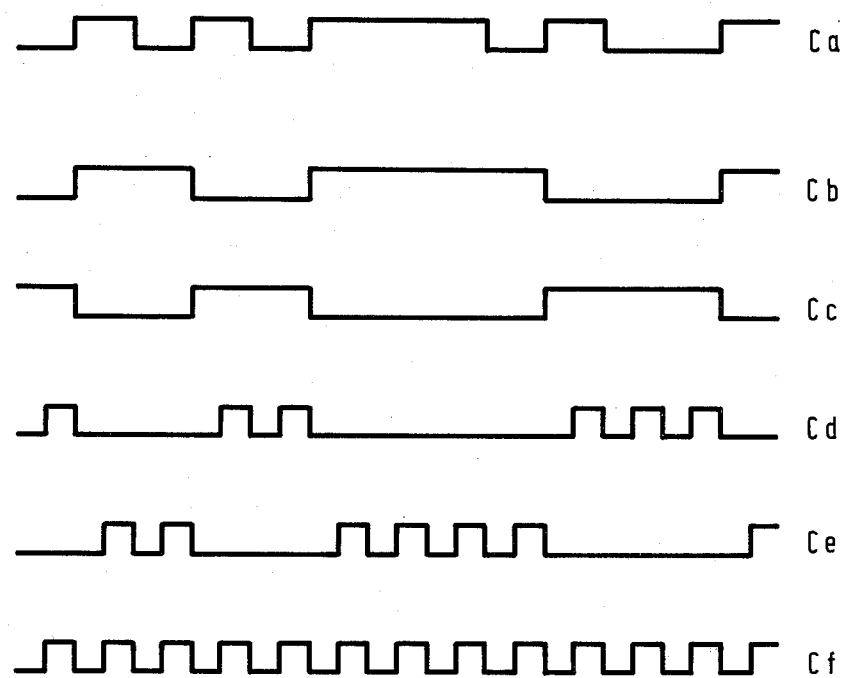
FIG. 3 shows time diagrams Ca to Cf, inclusive, to illustrate the signal variation in some points of the clock regeneration circuit shown in FIG. 2.

To explain the above, reference is made to FIG. 3, in which curve Ca illustrates an undisturbed digital code signal and the curves Cb to Cf, respectively, illustrate the sighal variation at the outputs e1 and e2 of the bistable multivibrator E, the signal variation at the outputs p11 and q11 of the modulo-32-counters P and Q and the signal variation of the total clock signal at the output n3 of the OR-gate N.

In response to noise and intersymbol interference, the pulse or code edges in the code signal at the data terminal 19 produce phase jitter in the clock signal. To suppress this phase jitter a window signal is generated in the window signal generating circuit 12, this signal being applied to the gate circuit 13 via the gate input 100. This window signal is composed of gate signals and blocking or inhibiting signals. During window periods or windows, the gate signals "open" the gate circuit 13, that is to say a positive pulse edge in the code signal then results in a change-over of the signal values at the outputs e1 and e2. The blocking signals "close" the gate circuit 13 outside of the window periods, that is to say pulse edges then have no effect whatsoever on the signals at the outputs e1 and e2.

In the initial or starting condition of the clock regeneration circuit 9, the windows have a length of one clock period, which means that the gate circuit 13 is continuously open. The functions of the two modulo-32-counters P and Q are interchanged in this condition at each positive pulse edge in the code signal. The duration of the windows becomes shorter after a number of positive pulse edges. The interchange of the dividing functions of the counters is caused by a certain selection of the positive pulse edges present in the code signal. The mutual positions of the windows are chosen so that the central window phases, that is to say the phases in the center of the windows, coincide with the code edge phase to be expected. The phase of a next positive code edge is predicted at a whole number of times the clock period distance from a pulse edge which occurs first within a window.

Since, as mentioned hereinbefore, the majority of code edges in the received code signal occur in the same phase, even in FM-signals which are just acceptable for the ear, the central window phases of the majority of phases will be spaced one clock period from one another. When, furthermore, the duration of the window periods are made to decrease gradually, code edges, the phase of which deviates from the average phase, have increasingly less effect on the location of the window, the windows therewith converging to this average phase of the code edges.

In order to generate such a window signal, the window signal generating circuit 12 comprises the cyclic counting device 15 having a modulo-32-counter BC', which has a resetting input bc'7 which is coupled to the signal lines 104 and 105 to the resetting input 18 via an OR-gate 101, a signal input bc'1 which is coupled to the pilot signal output 20 and outputs bc'3, bc'4, bc'5,, bc'6, bc'11. In this modulo-32-counter BC', the periods of the 19 kHz pilot signal are counted in a cycle of 32 phase steps, the signals at the outputs bc'3, bc'4, bc'5, bc'6 and bc'11 representing the phase steps corresponding with the pilot signal periods in the standardized bcd-coding. The Table in FIG. 4 shows this standardized bcd-coding for such a 32-phase step cycle in the columns O0 to O4, inclusive. The outputs bc'3, bc'4, bc'5 and bc'6 are coupled to inputs O0 to O3, respectively, of a counting code converter circuit CC. Outputs a, b, c and d of this counting code converter circuit CC are connected to inputs V'0 to v+3, inclusive, respectively, of a comparator circuit 103.

A code conversion is carried out in the counting code converter circuit CC, a sign inversion being used for the phase steps 0 to 15, inclusive, for the signals at the inputs O0 to O3, inclusive. The Table in FIG. 4 illustrates this code conversion for all phase steps for one counting cycle of the modulo-32 counter BC'. The signal values in the columns O3 to O0, inclusive, are converted into the signal values in the columns d, c, b and a, respectively.

Inputs v0 to v3, inclusive, of the comparator circuits 103 are connected to the outputs p, q, r and s, respectively, of a state counter 102, which functions as the window width control device. A signal input t of the state counter 102 is coupled to the output of the OR-gate 101. By means of a 32-state cycle, the state counter 102 divides the number of signal changes at the signal lines 104 and 105 by 4, showing at its output p, q, r and s a binary number, which according to the standardized BCD-coding represents ¼ of the number of positive pulse edges in the code signal at the data terminal 19. The binary numbers in accordance with the above-mentioned BCD-coding, are shown in the columns O0 to O3, respectively, in the Table of FIG. 4. The comparator circuit 103 has an output vu. The signal value at this output vu becomes high (1) only when equual signal values occur at the inputs v0 to v3, inclusive, and v'o to v'3, inclusive, respectively. The output vu is connected to inputs i1 and k1 of AND-gates I and K, respectively.

The output bc'11 of the modulo-32 counter BC' is coupled to an input i2 of the AND-gate I and is also coupled to input k2 of the AND-gate K via an inverter circuit M.

Outputs i3 and k3 of the AND-gates I and K are coupled to a setting input f7 and a resetting input f4, respectively, of a bistable multivibrator F of the JK-flip-flop type. Output f2 of the bistable multivibrator F is coupled to the gate input 100 of the gate circuit 13 for applying a window signal thereto. The resetting input 18 of the window signal generating circuit 12 is connected to a resetting input u of the state counter 102 and also to an input of the OR-gate 101.

In the initial position, immediately after tuning to a desired FM-signal, the signal values at the outputs p, q, r and s of the state counter 102 and at the outputs bc'3 to bc'6, inclusive, and bc'11 are low. The signal values at the outputs a to d of the code converter circuit CC and at the output of the inverter circuit M are consequently high. As the signal values at the inputs v0 to v3, inclusive, and v'0 to v'3, inclusive, of the comparator circuit 103 are not equal, the output Vu of the comparator circuit 103 is low so that the AND-gates I and K are closed and the output signal of the bistable multivibrator F is low. The gate circuit 13 is now opened.

In response to the 19 kHz pilot signal at the signal input bc'1 of the cyclic counting device BC', the signals at the inputs v'0 to v'3, inclusive, cycle through the values as shown in the columns d, c, b and a, respectively. At the 15$^{th}$ phase step, the signal values at the inputs v0 to v3 (0000), inclusive, are equal to those at the inputs v'0 to v'3, inclusive, causing the output vu to become high (1). The output of the inverter circuit m is also high at this phase step, so that a resetting signal is applied to the bistable multivibrator F via the AND-gate K, causing the output f2 to be switched to a high signal value (1) and an inhibit signal to be applied to the gate circuit 13, which is closed via one of the AND-gates G or H.

At the 16$^{th}$ phase step, the signal values at inputs v0 to v3 (0000), inclusive, are again equal to those at the inputs v'0 to v'3, inclusive, so that the output vu remains high (1). However, the output of the inverter circuit m is now low so that a setting signal is applied to the bistable multivibrator F via the AND-gate I causing the output f2 to be switched to a low signal value (0) and the gate circuit 13 to become conductive again. In this initial situation of the 15$^{th}$ to the 16$^{th}$ phase step, the inhibit period has a duration which is consequently negligibly small. The window period is now almost equal to one clock period (32/19 msec.), and comprises the phase steps 16 to 31, inclusive, of a counting cycle and the phase steps 0 to 15, inclusive, of a subsequent counting cycle. The central window phase coincides with the 31$^{st}$ phase step of the counting cycles.

When a positive pulse edge now occurs within the window period, the cyclic counting device BC' is reset to the initial position (0000) via the OR-gate 101 and the resetting input bc'7, that is to say the present counting cycle is ended and a new counting cycle is started immediately after the pulse edge. Thus, the counting position of the cyclic counting device BC' indicates the phase distance from the instantaneous phase step to the pulse edge which occurred last at the output of the gate circuit 13 and functions therefore also as a storage circuit. As the moment of occurrence of a window depends on the moment at which the counting position of the cyclic counting device BC' reaches the counting position of the state counter 102, this cyclic counting device BC' in conjunction with the state counter 102 functions as window phase control device, the comparator circuit 103 functioning as the phase selection circuit.

After 4 positive pulse edges at the output of the gate circuit 13, the counting position in the position counter 102 is increased by one to the position p q r s=0001 via the OR-gate 101. A resetting signal is now applied to the bistable multivibrator F at the 14$^{th}$ phase step and a setting signal is applied at the 17$^{th}$ phase step. An inhibit signal is applied to the gate circuit 13 from the 14$^{th}$ to the 17$^{th}$ phase step. Positive pulse edges during the inhibit signal cannot cause signal value changes at the signal lines 104 and 105 and, consequently, no phase jitter in the regenerated clock signal. The window period now comprises the 17$^{th}$ to 31$^{st}$ phase step, inclusive, of a first counting cycle and the phase steps 0 to 13, inclusive, of a subsequent second counting cycle of the 19 kHz pilot signal.

When, finally, the counting position of the position counter 102 reaches the position p q r s=1111 at the 128$^{th}$ positive pulse edge, a resetting signal is generated at the 0$^{th}$ phase step and a setting signal at the 31$^{st}$ phase step, so that the inhibit signal covers the range from the 0$^{th}$ to the 31$^{st}$ phase step and the window comprises only the 31$^{st}$ phase step. Function alternations between the modulo-32-counters P and Q of the divider 17 can now only be caused by positive pulse edges during this window period which was converged to the central window phase step. Pulse edges of this type occur in the same phase and therefore do not result in phase jitter in the regenerated clock signal at the output 73. At this phase indicates the average phase of the phases of code edges in the received signal, it corresponds with the phase of the clock signal with which coding was carried out in the transmitter. So a correct phase synchronization of the regenerated clock signal has been effected in this situation.

The above-described phase searching action can be restarted by applying a resetting signal to the resetting signal terminal 18, causing the position counter 102 and the cyclic counting device BC' to be adjusted to the initial state.

By way of illustration of the above-described phase synchronization, FIGS. 5a and 5b show by means of curves Cg, Ch, Ci, Cj and Ck, time diagrams of the transmitted digital code signal, the clock signal used during coding thereof, the received code signal at the data input 19, which signal is disturbed by noise and intersymbol interference, the window signal and the regenerated clock signal at the output 73 of the clock regeneration circuit 9, respectively. For clearness' sake, the state counter 102 is increased by one for every positive pulse edge in the code signal. The initial phase steps of the counting cycles are denoted by 0 on the time axes of the curves Cj and Ck. For complete counting cycles the last phase step is indicated by 31. The central inhibit phase step is indicated by the number 15.

The embodiment shown in the drawings utilizes a code conversion of the BCD coding of the phase steps of the 19 kHz pilot signal at the outputs bc'3, bc'4, bc'5, bc'6, and bc'11 of the cyclic counting device BC'. Thereafter, in order to obtain the window periods, a comparison is effected with the BCD-coded counting state of the state counter 102. It will be apparent that it is alternatively possible to convert the code of the counting state of the state counter and to compare it thereafter with the BCD coded phase steps of the 19 kHz pilot signal.

It will further be clear that it is alternatively possible to have the control of the state of the state counter 102 be determined by a constant integration time instead of by the number of positive pulse edges in the code signal.

In the implementation of the clock regeneration circuit as shown in FIG. 2, use has been made of integrated circuits, a description of which can be found in the abovementioned manuals.

For the bistable multivibrators of JK-flip-flop types E and F, use is made of integrated circuits (i.c.) of the type HEF 4027. Integrated circuits of the type HEF 4081 are used for the AND-gates G, H, K, I. Integrated circuits of the type HEF 4520 are used for the modulo-32-counters P and Q and also for the cyclic counting device BC'. An integrated circuit of the type HEF 4520 is also used in the state counter 102. The OR-gates N and 101 are of the type HEF 4071. The reference numerals used to denote the terminals in the manuals are the same as the reference numerals used for the terminals in the Figure.

Figure 6:
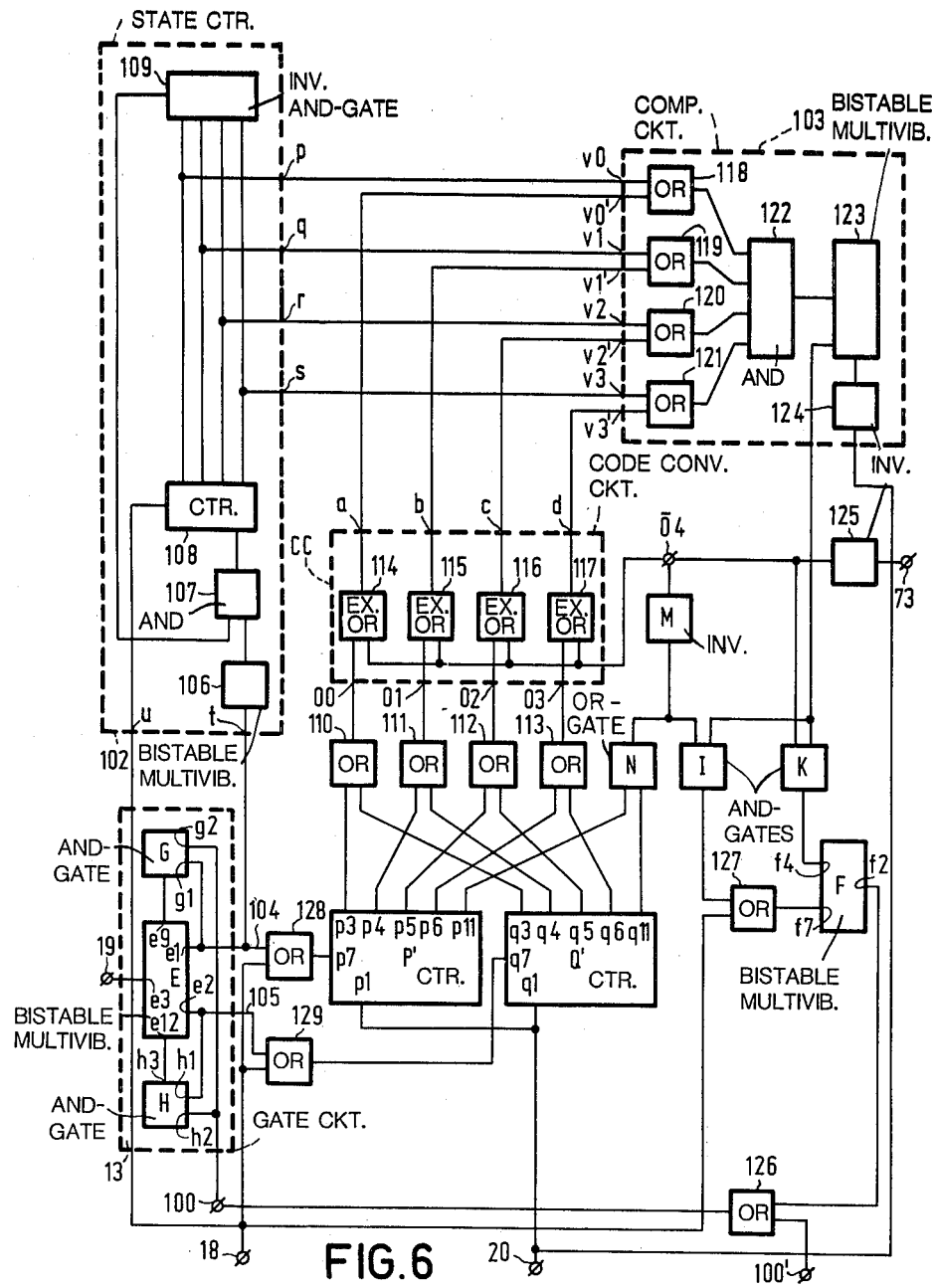
FIG. 6 shows a further practical construction of the clock regeneration circuit of FIG. 2.

FIG. 6 shows a further practical inplementation of the clock regeneration circuit shown in FIG. 2. The operation thereof predominantly corresponds with the embodiment shown in FIG. 2. The elements which have the same function as the elements of the circuit shown in FIG. 2 are given the same reference numerals.

The signal lines 104 and 105 include OR-gates 128 and 129, which render it possible to apply a setting signal to the modulo-32-counters P' and Q'. The function of the cyclic counting device BC' and the dividing function of the modulo-32-counters P and Q of the preceding FIG. 2 are combined in the modulo-32-counters P' and Q', whose outputs p3, p4, p5, p6 and outputs q3, q4, q5 and q6, respectively, are connected to inputs of OR-gates 110 to 113, respectively. These circuits replace the cyclic counting device BC' and the OR-gate 101 of the embodiment shown in FIG. 2. Outputs p11 and q11 are coupled to the output 73 of the clock regeneration circuit via the OR-gate N and the inverter circuits M and 125.

Outputs of the OR-gates 110 to 113, respectively, are connected to inputs 00 to 03, inclusive, of the code converter circuit CC. This code converter circuit CC comprises exclusive OR-gates 114 to 117, inclusive, first inputs of which are coupled to the inputs 00 to 03, respectively, and second inputs to an output 04 of the inverter circuit M. This results in the code conversion shown in Table 4.

The state counter 102 comprises a bistable multivibrator 106 of the JK flipflop type, which is connected to the signal line 104, and produces an output signal after every four positive signal value changes at the signal line 104. This output signal of the bistable multivibrator 106 is applied to a signal input of a modulo-32-counter 108 via an AND-gate 107. The modulo-32-counter 108 produces the signals shown in the columns 00 to 03 inclusive of the Table of FIG. 4.

A resetting input of the modulo-32-counter 108 is connected to the resetting signal terminal 18. The outputs p, q, r and s are coupled to an inverting AND-gate 109, which produces a blocking signal to the modulo-32-counter 108 via the AND-gate 107 when the last counting position, 1111 is reached. In this counting position the window width is at its minimum and the phase searching action is stopped.

The comparator circuit 103 comprises exclusive inverting OR-gates 118 to 121, inclusive, the respective inputs of which are connected to the inputs v0, v'0; v1, v'1; v2, v'2 and v3, v'3. Outputs of these OR-gates 118, to 121, inclusive, are coupled to an AND-gate 122, which, in the case of equal signal values at the last-mentioned inputs of the comparator circuit 104, applies a setting signal to a bistable multivibrator 123. This bistable multivibrator 123 is clocked by the 19 kHz pilot signal via an inverter circuit 124. An output of the bistable multivibrator 123 is coupled to an input of the AND-gate K.

An OR-gate 127, to which also a resetting signal can be applied via the resetting signal terminal 18, is connected between the output of the AND-gate I and the setting input f7 of the bistable multivibrator F. As a result of this, the bistable multivibrator F can be reset to the initial state by means of a resetting signal applied to the resetting terminal 18.

An OR-gate 126, an input of which is coupled to an inhibit signal terminal 100', is connected between the output f2 of the bistable multivibrator F and the gate input 100 of the gate circuit 13. By means of an inhibit signal at this inhibit signal terminal 100', it is possible to apply a second gate signal to the gate circuit 13, for example to suppress possible pulse edges which are followed within one clock period by a negative pulse edge. Such pulses are usually produced by interferences and can be suppressed by means of, for example, a pulse discriminator, not shown, as described in the United Kingdom Pat. No. 1,299,420. The code signal at the data input 19 must be delayed for a period of time equal to the maximum pulse width to be suppressed, when such a pulse discriminator is used.

In a practical embodiment integrated circuits are used as described in the above-mentioned manual. Integrated circuits of the type HEF 4071 are used to realize the OR-gates 128, 129, 110 to 113, inclusive, 126 and 127. Integrated circuits of the type HEF 4070 are used to realize the exclusive OR-gates 114 to 117, inclusive, integrated circuits of the types HEF 4081 and 4082 are used for the AND-gates 107 and 122. Integrated circuits of the type HEF 4077 are used for the exclusive inverting OR-gates 118 and 121. IC type HEF 4012 for the inverting AND-gate 109, type HEF 4049 for the inverter circuits 124, 125. The bistable multivibrators 106 and 123 are realized by means of integrated circuits of the types HEF 4027 and 4013. The reference numbers used to denote the terminals in the Figure are the same as the reference numerals used to denote the terminals in the manual. It will be obvious that the serial phase selection as realized in the embodiments shown in the FIGS. 2 and 6 may be combined with the parallel phase selection as described for the embodiment of FIG. 1. The rough parallel phase interval selection as described with reference to FIG. 1, in which the code signal is divided into frames having a period of the length of one clock period, each period being subdivided into n rough phase intervals from which the phase interval is selected in which the majority of code edges occurs, may be followed by a selection which is started with a window width of a size which is the same as this rough phase interval. As a result of this a still more rapid phase synchronization of the regenerated clock signal can be effected.

What is claimed is:

1. A clock regeneration circuit for an FM-receiver with transmitter characterization having a tuning unit connected to an aerial input and to which there are connected one after the other, an IF-amplifier, an FM-detector, a demodulation circuit for demodulating a discrete transmitter characterization signal, a decoding device for decoding the discrete transmitter characterization signal and a signal processing unit, also comprising a pilot regeneration circuit connected to the FM-detector for regenerating a stereo pilot signal, characterized in that the clock regeneration circuit comprises a phase search circuit having a cyclic counting device coupled to the pilot regeneration circuit for dividing at least a portion of the transmitter characterization signal into discrete phase steps determined by the periods of the pilot signal and also having a coincidence circuit connected to the cyclic counting device and to the demodulator for allotting phase steps to at least a portion of the pulse edges in the transmitter characterization signal, a storage circuit for storing the information about the phase steps and a phase selection circuit connected to the storage circuit for selecting the phase step in which, statistically, the greatest number of pulse edges occur in the transmitter characterization signal, the clock regeneration circuit also comprising a divider which has a setting input coupled to the phase selection circuit, a signal input to the pilot regeneration circuit and a signal output to an output of the clock regeneration circuit.

2. A clock regeneration circuit as claimed in claim 1, characterized in that the coincidence circuit comprises a gate circuit having a pulse edge detection circuit, the gate circuit having a data input connected to the demodulator and a gate input coupled to a window signal generating circuit, this window signal generating circuit being connected to the cyclic counting device and generating a window signal which, in at least one counting position of the cyclic counting device, opens the gate circuit for one window period in order to allot a phase step to at least one of the pulse edges occurring within the window period in the transmitter characterization signal.

3. A clock generation circuit as claimed in claim 2, characterized in that the gate circuit has n gates and the window signal generating circuit has n window signal generators connected between the cyclic counting device and the gates, for sequentially opening the gates at n counting positions of the cyclic counting device in each clock period, said storage circuit comprising n counting devices which are coupled to the outputs of the respective gates for counting the number of transmitter characterization signal pulse edges passed by the gates and the phase selection circuit comprising a top detection circuit for determining the counting device having the highest position after at least one clock period.

4. A clock generation circuit as claimed in claim 3, characterized in that n is equal to the number of periods of the pilot signal within one period of the clock signal.

5. A clock generation circuit as claimed in claim 3 or claim 4, characterized in that the top detection circuit comprises a threshold circuit for applying a setting signal to the divider when one of the counting devices reaches their threshold position.

6. A clock regeneration circuit as claimed in claim 2 or 3, characterized in that the window signal generating circuit comprises a window width control device for monotonously controlling, during one phase searching period, the duration of the window periods of the window signal from not more than one clock period to at least substantially zero, and a window phase control device which includes the storage circuit and the phase selection circuit for controlling the window phase, the windows of the window signal being at least substantially symmetrical and being located around a phase which is removed an integral number of times the clock period from the phase of a transmitter characterization signal pulse edge which occurs first in a preceding window.

7. A clock regeneration circuit as claimed in claim 6, characterized in that the window width control device comprises a state counter the state of which varies monotonously from an initial position to a final position during the phase searching period, and that the storage circuit comprises the cyclic counting device, a setting input of which is coupled to an output of the gate circuit for starting a counting cycle at a pulse edge which occurs first within a window period, the phase selection circuit having a comparison circuit connected to the state counter and to the cyclic counting device for switching over the signal value of the window signal at the cyclic counting device positions indicated by the position counter.

8. A clock regeneration circuit as claimed in claim 7, characterized in that the signal value of the window signal is switched over at positions of the cyclic counting device which are symmetrical relative to a position at half the cycle period of the cyclic counting device.

9. A clock regeneration circuit as claimed in claim 7, characterized in that the counting cycles of the state counter and the cyclic counting device contain an equal number of counting positions.

10. A clock regeneration circuit as claimed in claim 7, characterized in that an input of the state counter is coupled to an output of the demodulation circuit in order to control the decrease of the window periods in dependence on the occurrence of windows in which at least one pulse edge occurs.

11. A clock regeneration circuit as claimed in claim 6, characterized in that the clock regeneration circuit further comprises two modulo-n-counters which function as dividers and which are both coupled to an output of the pilot regeneration circuit via signal inputs and to an output of the gate circuit via setting inputs in order to be alternatively in operation at consecutive pulse edges in the output signal of the gate circuit.

12. A clock regeneration circuit as claimed in claim 11, characterized in that the cyclic counting device comprises the two modulo-n-counters the least significant outputs of which are coupled to the output of the clock regeneration circuit via an OR-gate.

* * * * *